US008600462B2

(12) United States Patent
Kato

(10) Patent No.: US 8,600,462 B2
(45) Date of Patent: Dec. 3, 2013

(54) COMPOSITE ANTENNA AND PORTABLE TELEPHONE

(75) Inventor: Hisatomo Kato, Daito (JP)

(73) Assignee: KYOCERA Corporation, Kyoto (JP)

( * ) Notice: Subject to any disclaimer, the term of this patent is extended or adjusted under 35 U.S.C. 154(b) by 68 days.

(21) Appl. No.: 13/321,782

(22) PCT Filed: May 24, 2010

(86) PCT No.: PCT/JP2010/003464
§ 371 (c)(1), (2), (4) Date: Nov. 21, 2011

(87) PCT Pub. No.: WO2010/137280
PCT Pub. Date: Dec. 2, 2010

(65) Prior Publication Data

US 2012/0064954 A1 Mar. 15, 2012

(30) Foreign Application Priority Data

May 27, 2009 (JP) ................................ 2009-127769

(51) Int. Cl.
*H04M 1/00* (2006.01)

(52) U.S. Cl.
USPC ........................ 455/575.7; 455/90.3; 343/751

(58) Field of Classification Search
USPC .................. 455/90.3, 128, 129, 550.1, 575.1, 455/575.3, 575.5, 575.7; 343/751
See application file for complete search history.

(56) References Cited

U.S. PATENT DOCUMENTS 7,427,958 B2 * 9/2008 Yoon et al. .................... 343/702
8,004,473 B2 * 8/2011 Chung et al. .................. 343/841
2005/0266903 A1 12/2005 Masaki
2007/0139282 A1 * 6/2007 Haruyama .................... 343/702
2010/0149053 A1 6/2010 Nakano et al.

FOREIGN PATENT DOCUMENTS

JP 2002-368660 A 12/2002
JP 2005-217623 A 8/2005
JP 2005-277703 A 10/2005
JP 2005-341265 A 12/2005
JP 2006-524022 A 10/2006
JP 2007-068153 A 3/2007

(Continued)

OTHER PUBLICATIONS

International Search Report dated Aug. 10, 2010, issued for International Application No. PCT/JP2010/003464.

(Continued)

*Primary Examiner* — Nhan Le

(74) *Attorney, Agent, or Firm* — Procopio, Cory, Hargreaves & Savitch LLP

(57) ABSTRACT

A complex antenna has a first antenna element and a second antenna element each connected at one end to a different feed point and connected to each other at the other end through a parallel resonant circuit. Each antenna element has the same resonant frequency as the parallel resonant circuit. A mobile phone has an antenna switch with a first port connected to the first antenna element, a second port connected to the second antenna element, and a third port that can be connected to one of the first port and the second port and switched therebetween. A signal processing unit causes the antenna switch to connect the third port to the first port or to the second port and detects a signal captured by one of the antenna elements from the output of the third port.

13 Claims, 7 Drawing Sheets

(56) References Cited

FOREIGN PATENT DOCUMENTS

| | | | |
|---|---|---|---|
| JP | 2007-116508 | A | 5/2007 |
| JP | 2009-038651 | A | 2/2009 |
| WO | 2009/028251 | A1 | 3/2009 |

OTHER PUBLICATIONS

Office Action dated Jul. 30, 2013, issued in counterpart Japanese Application No. 2009-127769.

* cited by examiner

COMPOSITE ANTENNA AND PORTABLE TELEPHONE

TECHNICAL FIELD

The present invention relates to a mobile phone, and particularly relates to an antenna implemented therein.

BACKGROUND ART

A mobile phone often incorporates an auxiliary antenna in addition to a main antenna. Normally, the main antenna is used for communications. In contrast, the auxiliary antenna is used instead of the main antenna when, for example, the main antenna happens to be covered by the mobile phone user's hand supporting the mobile phone casing and thereby causing deterioration of the reception conditions. Thus, good communication conditions are maintained for the mobile phone. As such, the mobile phone is able to select one antenna from a plurality of antennas for use in communications, switching to another antenna whenever reception conditions deteriorate. This is termed a diversity function.

In a conventional mobile phone, the main antenna and the auxiliary antenna are disposed within the casing at positions as far apart as possible. This is done to enhance the effect of the diversity function. For example, when the main antenna is disposed in the vicinity of the earphone unit, the auxiliary antenna is disposed near the mouthpiece unit or, if the mobile phone is a clamshell, near the hinge. This reduces the chances of the user's hand coming to simultaneously cover both the main antenna and the auxiliary antenna.

CITATION LIST

[Patent Literature]
[Patent Literature 1]
Japanese Patent Application Publication No. 2005-277703

SUMMARY OF INVENTION

Technical Problem

Although mobile phone miniaturization has progressed in recent years, demand for further miniaturization remains high. Recently, demand for greater mobile phone multi-functionality has further increased. The effect of the diversity function is to allow for greater overall miniaturization to the extent that the main antenna and the auxiliary antenna can be brought as close together as possible. This frees up space for mounting other functional components, and is desirable in order to fit a greater number of functional components into a smaller casing.

However, with conventional technology, bringing a conventional main antenna and auxiliary antenna too close together greatly increases the incidence of interference therebetween. This presents difficulties in maintaining the reception characteristics of the antennas. As a result, difficulties result from arranging the main antenna and the auxiliary antenna close together, as is needed to take advantage of the diversity effect.

An object of the present invention is thus to provide a mobile phone in which further miniaturization is realizable.

Solution to Problem

The complex antenna of the present invention comprises: a first feed point and a second feed point, distinct from each other; a first antenna element connected at a base end thereof to the first feed point; a second antenna element connected at a base end thereof to the second feed point; and a parallel resonant circuit connected between a tip end of the first antenna element and a tip end of the second antenna element. Here, the second antenna element and the parallel resonant circuit both resonate at a frequency equal to the resonant frequency of the first antenna element.

The mobile phone of the present invention includes the aforementioned complex antenna as well as an antenna switch and a signal processing unit. The antenna switch includes a first port connected to the first feed point, a second port connected to the second feed point, and a third port distinct from the first port and the second port. The antenna switch receives a control signal from outside and connects the third port to one of the first port and the second port in accordance with the received control signal. A signal processing unit applies the control signal to the antenna switch so as to cause the antenna switch to connect the third port to one of the first port and the second port, and detects a signal captured by the first antenna element or by the second antenna element from output of the third port.

Advantageous Effects of Invention

The complex antenna of the present invention allows for greater miniaturization. By implementing the complex antenna, the mobile phone of the present invention also allows further miniaturization to be realized.

DESCRIPTION OF EMBODIMENTS

A preferred Embodiment of the present invention is described below, with reference to the accompanying drawings.

[Embodiment 1]

Figure 1:
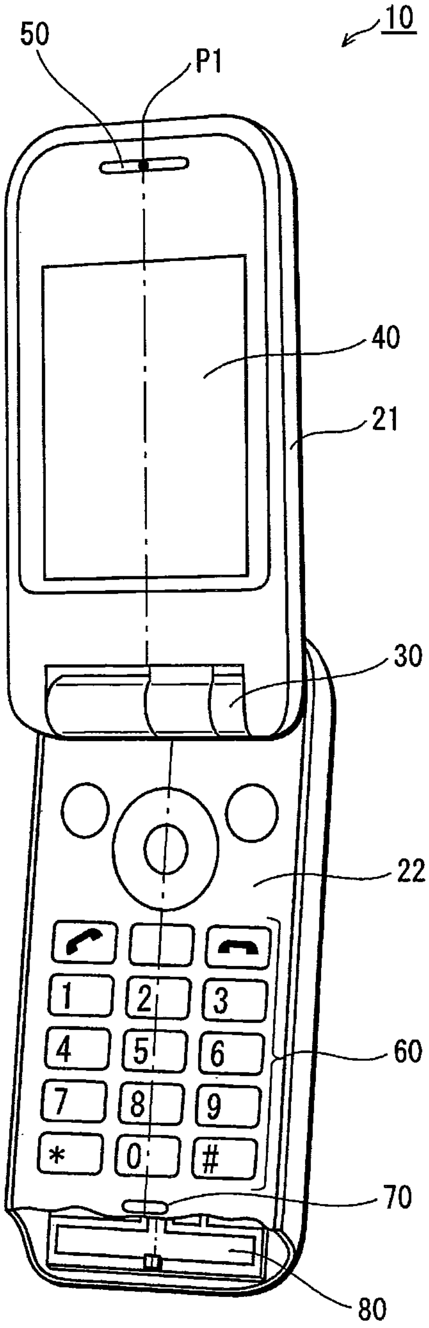
FIG. 1 is a perspective diagram of a mobile phone pertaining to Embodiment 1 of the present invention.

FIG. 1 is a perspective diagram of a mobile phone 10 pertaining to Embodiment 1 of the present invention. The mobile phone 10 is a clamshell phone made up of a first casing 21 and a second casing 22 connected via a hinge 30 so as to enable opening and closing. FIG. 1 illustrates a particular instance in which the first casing 21 and the second casing 22 are open. Ordinarily, when the mobile phone 10 is used for a call, the first casing 21 and the second casing 22 remain open, as shown in FIG. 1.

The first casing 21 includes a display unit 40 and an earphone unit 50, embedded therein. The display unit 40 is a liquid crystal display. As shown in FIG. 1, the screen of the display unit 40 is provided on the surface of the first casing 21 and is exposed when the first casing 21 and the second casing 22 are open. The earphone unit 50 includes a speaker. When the mobile phone 10 is used for a call, the speaker reproduces sounds produced by the other party in the conversation. The earphone unit 50 is provided at an end of the first casing 21 in a position opposite the hinge 30. A slit or hole is provided at the end for audio output to pass through.

The second casing 22 includes an operation panel 60 and a mouthpiece unit 70, embedded therein. The operation panel 60 includes a group of buttons, particularly including a keypad. As shown in FIG. 1, the group of buttons is provided on the surface of the second casing 22, being exposed when the first casing 21 and the second casing 22 are open. The operation panel 60 detects button presses by a user and outputs information pertaining to any buttons detected as being pressed. The mouthpiece unit 70 includes a microphone. When the mobile phone 10 is used for a call, the microphone converts voices produced by the user into electrical signals. The mouthpiece unit 70 is provided at an end of the second casing 22 at a position opposite the hinge 30. A slit or hole is provided at the end for sounds to pass through.

The second casing 22 further includes an embedded complex antenna 80. For ease of explanation, FIG. 1 illustrates the second casing 22 with the surface partially removed at the end opposite the hinge 30 so as to illustrate the complex antenna 80 embedded therein. The complex antenna 80 has a resonant frequency belonging to the 800 MHz band or to the 2 GHz band, and is used for radio communication between the mobile phone 10 and a base station.

Figure 2:
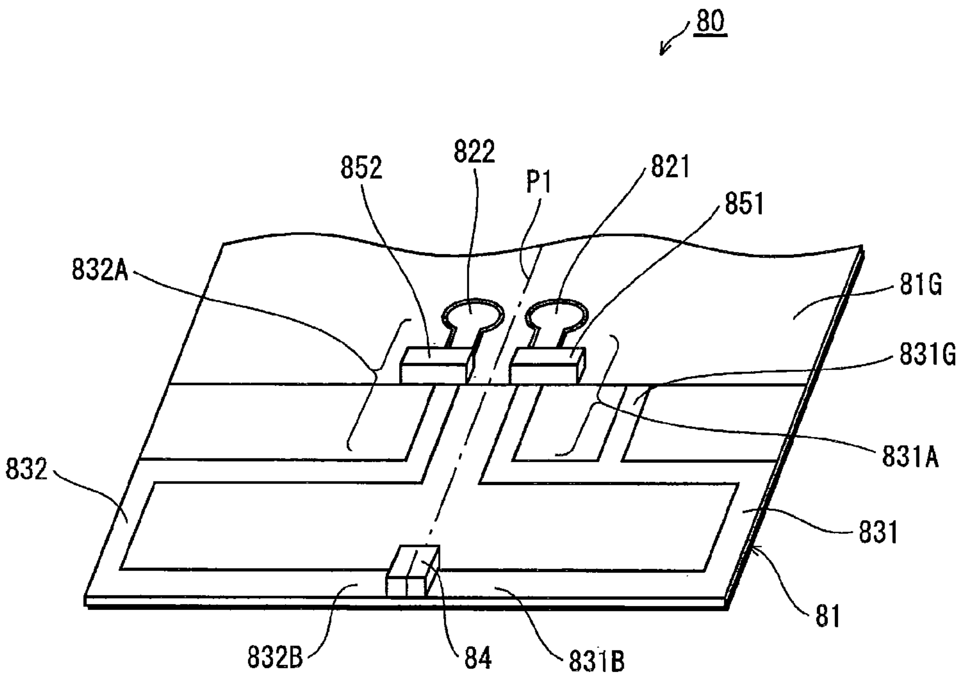
FIG. 2 is a perspective diagram of a complex antenna shown in FIG. 1.

FIG. 2 is a perspective diagram of the complex antenna 80 shown in FIG. 1. The complex antenna 80 is formed over the surface of an insulating substrate 81. In this example, the surface of the substrate 81 includes a portion covered by a ground conductor film 81G. Although not shown in FIG. 2, a control circuit for the mobile phone 10, including a later-described signal processing unit 100 and so on, is implemented on the ground conductor film 81G. The complex antenna 80 includes a first feed point 821, a second feed point 822, a first antenna element 831, a second antenna element 832, a parallel resonant circuit 84, a first matching circuit 851, and a second matching circuit 852. The first antenna element 831, the second antenna element 832, and the parallel resonant circuit 84 are formed at one end of the surface of the substrate 81 that is not covered by the ground conductor film 81G.

The first feed point 821 and the second feed point 822 are mutually-distinct pads on the substrate 81, formed of a conductive film within the area covered by the ground conductor film 81G. The feed points 821 and 822 are separated from the ground conductor film 81G by a predetermined distance, thus being insulated therefrom. Although not shown in FIG. 2, the first feed point 821 and the second feed point 822 are connected to different ports of a later-described antenna switch through a trace on the substrate 81.

The first antenna element 831 is a strip of conductive film formed over the substrate 81, i.e., a microstrip. The base end 831A of the first antenna element 831 is connected to the first feed point 821, extends therefrom along the inside of the ground conductor film 81G and passes through the first matching circuit 851 to the outside of the ground conductor film 81G. Inside the ground conductor film 81G, the base end 831A of the first antenna element 831 is separated from the ground conductor film 81G by a predetermined distance and is thus insulated therefrom. Outside the ground conductor film 81G, the first antenna element 831 extends toward the edge of the substrate 81 and further extends along the edge. The tip end 831B of the first antenna element 831 is connected to one terminal of the parallel resonant circuit 84, which is implemented at the edge of the substrate 81. Also, the first antenna element 831 branches at a point along the portion thereof extending toward the edge of the substrate 81. A branch portion 831G extending from the branch point is connected to the ground conductor film 81G. The full length of the first antenna element 831, from the base end 831A to the tip end 831B, is equal to one quarter of the wavelength band used in communications, i.e., one quarter-length of an electromagnetic wave in the 800 MHz band or in the 2 GHz band. Accordingly, the resonant frequency of the first antenna element 831 is in the 800 MHz band or in the 2 GHz band. Furthermore, the position and length of the base end 831A and of the branch portion 831G of the first antenna element 831, as well as the impedance of the first matching circuit 851, are set such that the impedance is matched between the first antenna element 831 and a communications unit (not shown in FIG. 2) of the mobile phone 10 connected to the first feed point 821. Although not illustrated in FIG. 2 for the sake of simplicity, the first matching circuit 851 is made up of a passive element implemented on the substrate 81.

The second antenna element 832 is a strip of conductive film formed over the substrate 81, i.e., a microstrip. The base end 832A of the second antenna element 832 is connected to the second feed point 822, extending therefrom along the inside of the ground conductor film 81G and passing through the second matching circuit 851 to the outside of the ground conductor film 81G. Inside the ground conductor film 81G, the base end 832A of the second antenna element 832 is separated from the ground conductor film 81G by a predetermined distance and is thus insulated therefrom. Outside the ground conductor film 81G, the second antenna element 832 extends to an edge of the substrate 81 in the opposite direction as the first antenna element 831, further extending along said edge. The tip end 832B second antenna element 832 is connected to a different terminal of the parallel resonant circuit 84 on the opposite side as the tip end 831B of the first antenna element 831. The full length of the second antenna element 832, from the base end 832A to the tip end 832B is equal to the full length of the first antenna element 831 from the base end 831A to the tip end 831B, i.e., one quarter-length of an electromagnetic wave in the 800 MHz band or in the 2 GHz band. Accordingly, the resonant frequency of the second antenna element 832 is equal to that of the first antenna element 831. Furthermore, the impedance of the second matching circuit 852 is set such that the impedance is matched between the second antenna element 832 and a communications unit (not shown in FIG. 2) of the mobile phone 10 connected to the second feed point 822. Although not illustrated in FIG. 2 for the sake of simplicity, the second matching circuit 852 is made up of a passive element implemented on the substrate 81.

As shown in FIG. 2, the surface of the substrate 81 is divided into two symmetrical regions with respect to a straight virtual line P1. The first antenna element 831 is disposed in one of these regions while the second antenna element 832 is disposed in the other. The substrate 81 is arranged within the second casing 22 so as to be substantially parallel to the surface of the second casing 22 that includes the button group of the operation panel 60 shown in FIG. 1. Also, as shown in FIG. 1, the above-described straight virtual line P1 is contained in a virtual plane that passes through the mouthpiece unit 70 and the earphone unit 50 when the first casing 21 and the second casing 22 are open. In FIG. 1, the intersections of the plane and the surface of the first casing 21 and of the plane and the second casing 22 are shown as the chained line P1. In particular, the plane is substantially perpendicular to the surface of the first casing 21 that includes the screen of the display unit 40, the surface of the second casing 22 that includes the button group of the operation panel 60, and the substrate 81 of the complex antenna 80. Within the second casing 22, the first antenna element 831 and the second antenna element 832 are disposed symmetrically with respect to the plane.

While not illustrated in FIG. 2 for the sake of simplicity, the parallel resonant circuit 84 is made up of a chip inductor and a chip capacitor implemented at the surface of the end of the substrate 81.

Figure 3:
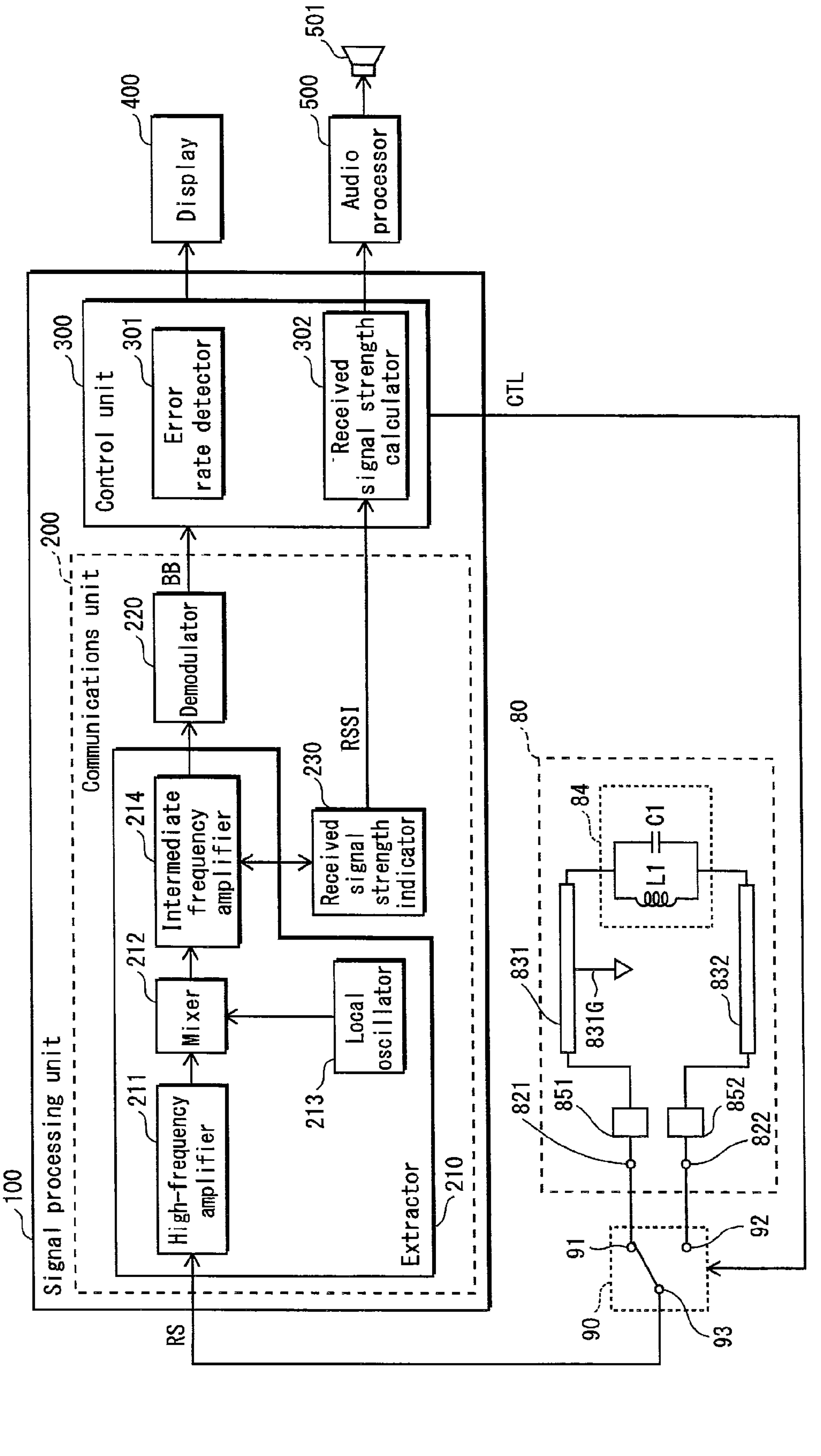
FIG. 3 is an equivalent circuit diagram of the complex antenna shown in FIG. 1, and a functional block diagram of a mobile phone reception system connected to the complex antenna.

FIG. 3 is an equivalent circuit diagram of the complex antenna 80. As shown in FIG. 3, the parallel resonant circuit 84 is equivalent to a parallel connection of an inductor of inductance L1 and a capacitor of capacitance C1. The resonant frequency of the equivalent circuit is $1/\{2\pi(L1\times C1)^{1/2}\}$. This is also equal to the resonant frequency of the first antenna element 831 and of the second antenna element 832. As such, the resonant frequency of the parallel resonant circuit 84 belongs to the 800 MHz band or in the 2 GHz band.

The parallel resonant circuit 84 is connected between the tip end 831B of the first antenna element 831 and the tip end 832B of the second antenna element 832. Thus, the voltages of the antenna elements 831 and 832 maintain the same direct current components. Also, the resonant frequency of the parallel resonant circuit 84 is equal to that of the antenna elements 831 and 832. Thus, the impedance of the parallel resonant circuit 84 is sufficiently high in the neighborhood of the resonant frequency of the antenna elements 831, 832. Accordingly, when one of the two antenna elements 831 and 832 is made to resonate by the power fed thereto by one of the two feed points 821 and 822, the resonance is obstructed by the parallel resonant circuit 84 and does not reach the other antenna element 831 or 832. The above effect decreases the incidence of interference between the two antenna elements 831 and 832, irrespective of the distance therebetween. Consequently, the complex antenna 80 maintains sufficiently good reception characteristics , even when the two antenna elements 831 and 832 are integrated on a common substrate 81 as shown in FIG. 2, and are concentrated in the vicinity of the mouthpiece unit 70 of the mobile phone 10 as shown in FIG. 1. As such, the proportional internal surface area of the second casing 22 of the mobile phone 10 occupied by the complex antenna 80 is appreciably decreased while maintaining said good reception characteristics.

FIG. 3 further illustrates a functional block diagram of the reception system of the mobile phone 10, which is connected to the complex antenna 80. As shown in FIG. 3, the reception system of the mobile phone 10 includes an antenna switch 90 and the signal processing unit 100.

The antenna switch 90 includes three distinct ports 91, 92, and 93. The first port 91 is connected to the first feed point 821 of the complex antenna 80, the second port 92 is connected to the second feed point 822, and the third port is connected to a communications unit 200. The antenna switch 90 receives a control signal CTL from a control unit 300, then connects the third port 93 to the first port 91 or to the second port 92 in response to the control signal CTL.

The signal processing unit 100 includes the communications unit 200 and the control unit 300. The communications unit 200 detects a signal captured by the first antenna element 831 or by the second antenna element 832 from the output of the third port 93 of the antenna switch 90. In particular, the communications unit 200 includes an extractor 210, a demodulator 220, and a received signal strength indicator 230.

The extractor 210 extracts a signal at the resonant frequency of the first antenna element 831 or of the second antenna element 832 from the output RS of the third port 93. FIG. 3 illustrates an example where a superheterodyne is used as the extractor 210. The extractor 210 includes a high-frequency amplifier 211, a mixer 212, a local oscillator 213, and an intermediate frequency amplifier 214. The high-frequency amplifier 211 amplifies the output RS of the third port 93. Accordingly, the high-frequency signal captured by one of the antenna elements 831 and 832 is amplified while being unaffected by any noise produced by the mixer 212 and the like in downstream circuit components. The high-frequency amplifier 211 is preferably a low-noise amplifier (LNA) that suppresses any noise produced therein to a level sufficiently lower than that of the amplified signal. The mixer 212 multiplies the output of the high-frequency amplifier 211 by the output of the local oscillator 213. Here, the local oscillator 213 outputs a signal of a constant frequency. The constant frequency is set so as to be lower than the frequency of the signal captured by one of the antenna elements 831 and 832, i.e., in the 800 MHz band or in the 2 GHz band; the difference in frequency is equal to the frequency processed by the demodulator 220, i.e., the intermediate frequency. The intermediate frequency is typically between 1 MHz and a few hundred MHz. The intermediate frequency amplifier 214 extracts the intermediate frequency components from the output of the mixer 212 using a filter, for example, and then amplifies the components so extracted for output to the demodulator 220.

The demodulator 220 demodulates a signal at a predetermined frequency, i.e., the baseband signal BB, from the intermediate frequency signal extracted by the extractor 210. Here, the signal transmitted from the base station to the mobile phone 10 has been modulated using amplitude modulation (AM), amplitude-shift keying (ASK), pulse modulation, or the like. Accordingly, the demodulator 220 is configured to match the modulation method employed.

The received signal strength indicator 230 detects the strength of the signal extracted by the extractor 210. More specifically, the received signal strength indicator 230 receives the intermediate frequency signal extracted from the output of the mixer 212 by the filter in the intermediate frequency amplifier 214, then generates a received signal strength indicator signal RSSI corresponding to the level of the signal so received. The received signal strength indicator signal RSSI is an analogue signal at a level that varies according to level of the intermediate frequency signal received from the above-described filter. Ideally, the level of the received signal strength indicator signal RSSI is proportional to that of the intermediate frequency signal.

The control unit 300 applies the control signal CTL to the antenna switch 90 so as to cause the antenna switch 90 to connect the third port 93 to one of the first port 91 and the second port 92. At this time, the control unit 300 receives the signal detected by the communications unit 200, i.e., the baseband signal BB. Furthermore, the control unit 300 controls a display unit 400 and an audio processor 500, also embedded in the mobile phone 10, according to the baseband signal BB. Accordingly, when the baseband signal BB indicates email or video content, text and images represented by the email and the video content are reproduced on the screen of the display unit 40, shown in FIG. 1, by the display unit 400. Also, when the baseband signal BB indicates audio content from the opposite party, the baseband signal BB is converted into sounds by the audio processor 500 and by a speaker 501, and the sounds are output from the earphone unit 50, shown in FIG. 1.

Aside from the above-described processing, the control unit 300 also evaluates the quality of the signal detected by the communications unit 200 from the output RS of the third port 93 when the third port 93 is connected to one of the first port 91 and the second port 92. Here, the quality of the signal is evaluated from the strength or error rate thereof In addition, when the quality is evaluated as falling outside a tolerance range, the control unit 300 applies the control signal CTL to the antenna switch 90 so as to cause the antenna switch 90 to switch the connection of the third port 93 from one of the first port 91 and the second port 92 to the other. Accordingly, the antenna element used for reception is switched between the two antenna elements 831 and 832 whenever the received signal quality is evaluated as falling outside the tolerance range.

The control unit 300 preferably includes an error rate detector 301 and a received signal strength calculator 302. The error rate detector 301 detects the error rate of the baseband signal BB received from the communications unit 200. In this example, the frame error rate (FER) is detected as the error rate. Otherwise, the bit error rate may also be detected. The received signal strength calculator 302 performs an analogue/digital conversion on the received signal strength indicator signal RSSI from the received signal strength indicator 230 and generates a digital value corresponding to the level thereof The digital value indicates the strength of the signal detected from the output RS of the third port 93 by the communications unit 200.

The control unit 300 determines whether or not the digital value generated by the received signal strength calculator 302 falls within the tolerance range, and, similarly, whether or not the error rate detected by the error rate detector 301 falls within the tolerance range. Furthermore, when either one of the digital value and the error rate fall outside the respective tolerance ranges, the control unit 300 applies a control signal CTL to the antenna switch 90 so as to cause the antenna switch 90 to switch the connection of the third port 93.

Here, the tolerance range for the above-described digital value and the tolerance range for the above-described error rate are set so as to satisfy the condition of allowing the control unit 300 to reproduce source information from the baseband signal BB to a acceptable degree of accuracy. For example, when the above-described digital value falls within the tolerance range, reception conditions are considered well-maintained using the current antenna element. However, when the above-described digital value falls outside the tolerance range, reception conditions on the current antenna element are considered too poor. The same applies to the above-described error rate.

Figure 4:
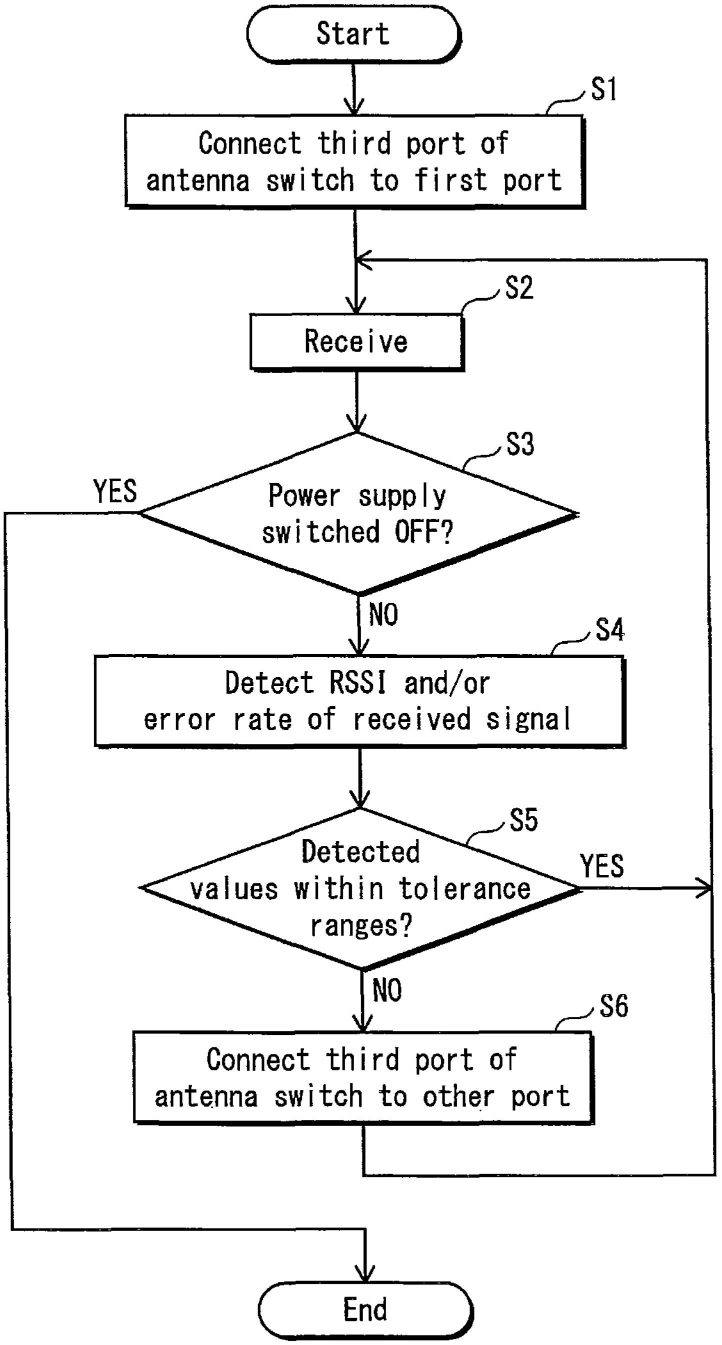
FIG. 4 is a flowchart of a reception process by the reception system shown in FIG. 3.

FIG. 4 is a flowchart of the reception system shown in FIG. 3, i.e. of the reception process performed by the antenna switch 90 and the signal processing unit 100. The antenna switch 90 and the signal processing unit 100 perform the following reception processing by using the complex antenna 80 in the diversity function.

Step S1: When, for example, the power supply of the mobile phone 10 is switched ON, the control unit 300 applies the control signal CTL to the antenna switch 90 so as to connect the third port 93 to the first port 91.

Step S2: The communications unit 200 detects the signal captured by the first antenna element 831 or by the second antenna element 832 from the output of the third port 93. Specifically, after step S1, when step S2 first occurs, the communications unit 200 detects the signal captured by the first antenna element 831 from the output RS of the third port 93. The communications unit 200 further demodulates the baseband signal BB from the signal so detected, and passes the result to the control unit 300. Meanwhile, the communications unit 200 generates the received signal strength indicator signal RSSI from the strength of the signal so detected, and passes the result to the received signal strength calculator 302. The control unit 300 determines whether or not the baseband signal BB received from the communications unit 200 indicates information from the base station. When the baseband signal BB is found to indicate information from the base station, the control unit 300 further decodes this information from the baseband signal BB and controls the various components of the mobile phone 10, such as the display unit 400 and the audio processor 500, according to the decoded information. When, for example, the decoded information is email or video content, text and images represented by the email and the video content are reproduced on the screen of the display 40 by the display unit 400. When the information is sound from the opposite party, the baseband signal BB is converted into sound by the audio processor 500 and the speaker 501.

Step S3: While performing processing in accordance with the information decoded from the baseband signal BB, the control unit 300 monitors reception by the operation panel 60 of a power OFF instruction from the user. When the operation panel 60 receives a power OFF instruction from the user, the control unit 300 terminates reception processing. As long as no power OFF instruction is received from the user by the operation panel 60, processing continues to step S4.

Step S4: The error rate detector 301 detects the error rate of the baseband signal BB. Meanwhile, the received signal strength calculator 302 converts the level of the received signal strength indicator signal RSSI into a digital value.

Step S5: The control unit 300 determines whether or not either one of the error rate detected by the error rate detector 301 and the digital value converted by the received signal strength calculator 302 fall within the respective tolerance ranges. If one of the error rate and the digital value falls outside the tolerance range, then the processing advances to step S6. If both fall within the respective tolerance ranges, then the processing returns to step S2.

Step S6: The control unit 300 applies the control signal CTL to the antenna switch 90 so as to cause the antenna switch 90 to switch the connection of the third port 93. Accordingly, the communications unit 200 detects the signal captured by the other one of the two antenna elements 831 and 832 from the output of the third port 93.

By repeating the above-described steps S2 through S6, the antenna element used for reception is switched between the two antenna elements 831 and 832 every time either the strength of a signal detected by the communications unit 200 from the output RS of the third port 93 of the antenna switch 90 or the error rate of the baseband signal BB converted from the signal by the communications unit 200 fall outside the respective tolerance ranges.

The mobile phone 10 is used for calls while in the form illustrated in FIG. 1. As such, the mobile phone 10 is supported by the user's hand in such a way that mouthpiece unit 70 is placed near the mouth and the earphone unit 50 is placed near the ear. Thus, the portion of the second casing 22 covered by the user's hand will greatly vary depending on whether the user's hand is a right hand or a left hand. Particularly, the different portions covered by a right hand and a left hand exhibit symmetry with respect to the virtual plane passing through the mouthpiece unit 70 and the earphone unit 50. For example, with reference to FIG. 1, when the hand is a right hand, the area to the right of the chained line P1 located at the intersection of the plane and the second casing 22 is more likely to be covered than the area to the left. The opposite holds when the hand is a left hand. Here, as shown in FIGS. 1 and 2, the two antenna elements 831 and 832 are disposed within the mobile phone 10 so as to exhibit symmetry with respect to the aforementioned chained line P1. Accordingly, when the user's hand supporting the second casing 22 covers one of the antenna elements, there is a strong probability that the other antenna element remains uncovered. For example, when the user's right hand covers the first antenna element 831, there is a strong probability that the second antenna element 832 remains uncovered. That is, when the hand causes reception condition deterioration for the first antenna element 831, there is a strong probability that good reception is maintained in the second antenna element 832. On the other hand, the control unit 300 causes the antenna switch 90 to switch the connection of the third port 93 whenever reception condition deterioration of the first antenna element 831 causes the strength of a signal captured by the first antenna element 831 or the error rate of the baseband signal BB converted from the signal to fall outside the respective tolerance range. Accordingly, the antenna element used for reception is switched from the first antenna element 831 to the second antenna element 832. Thus, there is a high probability that good reception conditions are maintained for the complex antenna 80 as a whole.

According to the above, the mobile phone 10 makes highly effective use of the diversity function, despite the complex antenna 80 being concentrated in the vicinity of the mouthpiece unit 70. Consequently, the mobile phone 10 enables further improvement of communication quality and connectivity with the base station, thereby further enabling miniaturization and multifunctional realization.

[Embodiment 2]

Figure 5:
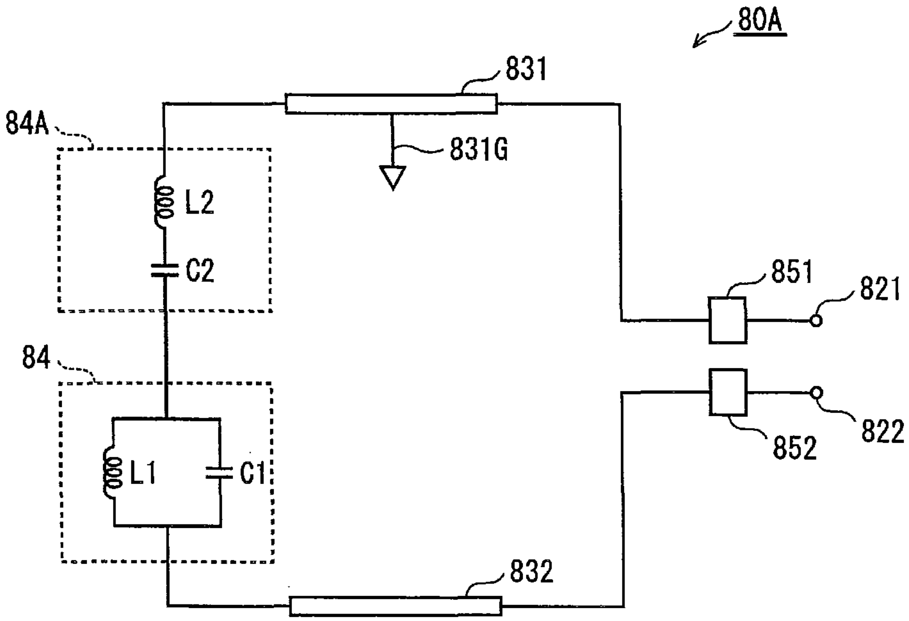
FIG. 5 is an equivalent circuit diagram of the complex antenna pertaining to Embodiment 2 of the present invention.

FIG. 5 is an equivalent circuit diagram of the complex antenna 80A pertaining to Embodiment 2 of the present invention. The complex antenna 80A differs from the complex antenna 80 shown in FIG. 3 in the inclusion of a series resonant circuit 84A. Aside from this point, the complex antenna 80A pertaining to Embodiment 2 is identical to the above-described complex antenna 80 pertaining to Embodiment 1. That is, the complex antenna 80A shown in FIG. 5 is, like the complex antenna 80 shown in FIG. 2, disposed within the second casing 22 of the mobile phone 10 from FIG. 1, being particularly concentrated in the vicinity of the mouthpiece unit 70. Furthermore, the structure of the complex antenna 80A shown in FIG. 5 as implemented on the substrate is identical to that of the complex antenna 80 shown in FIG. 2. Accordingly, FIG. 5 uses the same reference numbers as FIGS. 1, 2, and 3 to refer to components identical to those of the complex antenna 80 pertaining to Embodiment 1. Further still, explanations of such identical components can be found in the description of Embodiment 1.

As shown in FIG. 5, the series resonant circuit 84A is disposed between the parallel resonant circuit 84 and the first antenna element 831. Alternatively, the series resonant circuit 84A may be disposed between the parallel resonant circuit 84 and the second antenna element 832, in a reversal of FIG. 5. Like the parallel resonant circuit 84 shown in FIG. 2, the series resonant circuit 84A is made up of a chip inductor and a chip capacitor, implemented on the substrate of the complex antenna 80A.

Here, the full length of each antenna element 831 and 832 is equal to one quarter-length of an electromagnetic wave in the frequency band used for communications. Accordingly, the total length, from the base end of the first antenna element 831 connected to the first feed point 821 through the series resonant circuit 84A and the parallel resonant circuit 84 to the tip end of the second antenna element 832 connected to the second feed point 822, is equivalent to approximately twice the full length of each antenna element 831 and 832. Consequently, when the total length is considered to be a single antenna element, the resonant frequency of that antenna element is approximately half the resonant frequency of the antenna elements 831 and 832. For example, let the frequency bands usable for communications be the 800 MHz and 2 GHz bands. The shape and length of the antenna elements 831 and 832 are designed such that the resonant frequency of each of the antenna elements 831 and 832 belongs to the 2 GHz band, while the resonant frequency of the two antenna elements 831 and 832 combined belongs to the 800 MHz band. Accordingly, the complex antenna 80A is configured to serve as a two-band antenna using both the 800 MHz and 2 GHz frequency bands.

Like the reception processing of Embodiment 1, the antenna switch 90 and the signal processing unit 100 use the first antenna element 831 and the second antenna element 832 in the diversity function for signal processing in the higher frequency band, e.g., 2 GHz, used by the complex antenna 80A. On the other hand, signal processing in the lower frequency band, e.g., 800 MHz, used by the complex antenna 80A involves the signal processing unit 100 having the third port 93 of the antenna switch 90 connected to one of the first port 91 and the second port 92, then detecting the signal captured by the first antenna element 831 and the second antenna element 832 as a whole from the output RS of the third port 93. Specifically, the signal is in the lower frequency band, e.g., 800 MHz, used by the complex antenna 80A. As such, the mobile phone pertaining to Embodiment 2 of the present invention uses two different frequency bands, e.g., 800 MHz and 2 GHz, for communications with a single complex antenna 80A.

Reception in the higher frequency band used by the complex antenna 80A, e.g., 2 GHz, involves the parallel resonant circuit 84 blocking interference between the two antenna elements 831 and 832. Accordingly, like the complex antenna 80 pertaining to Embodiment 1, the complex antenna 80A can be used in the diversity function by the reception system of the mobile phone 10. That is, the complex antenna 80A maintains sufficiently good reception characteristics despite the two antenna elements 831 and 832 are integrated on a common substrate 81 as shown in FIG. 2 and concentrated in the vicinity of the mouthpiece unit 70 of the mobile phone 10 as shown in FIG. 1. As such, the proportional internal surface area of the second casing 22 of the mobile phone 10 occupied by the complex antenna 80A is appreciably decreased while maintaining said good reception characteristics.

As shown in FIG. 5, the series resonant circuit 84A is equivalent to an inductor of inductance L2 and a capacitor of capacitance C2, connected in series. The resonant frequency of the series resonant circuit 84A is therefore $1/\{2\pi(L2\times C2)^{1/2}\}$, equivalent to the resonant frequency of the antenna elements 831 and 832 when treated as a single antenna. That is, the resonant frequency of the series resonant circuit 84A belongs to the lower frequency band used by the complex antenna 80A, e.g., 800 MHz. By adjusting the impedance of the series resonant circuit 84A, the two antenna elements 831 and 832 in the vicinity of the resonant frequency are sufficiently well-matched. Accordingly, the complex antenna 80A offers better reception characteristics in the lower frequency band through the series resonant circuit 84A.

[Embodiment 3]

Figure 6:
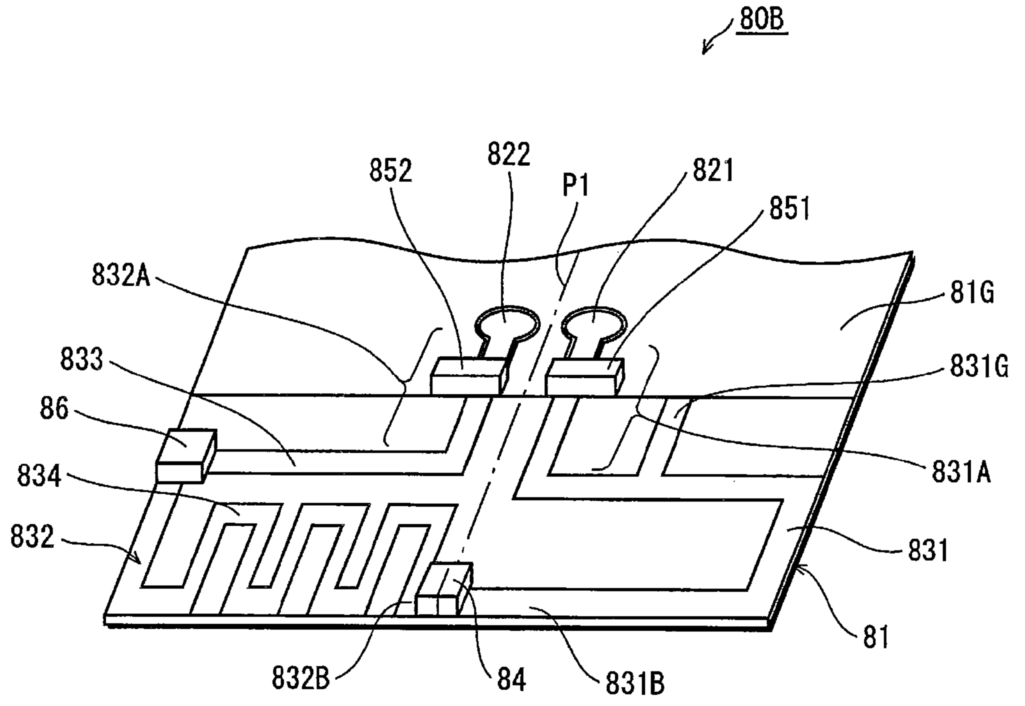
FIG. 6 is a perspective diagram of the complex antenna pertaining to Embodiment 3 of the present invention.
Figure 7:
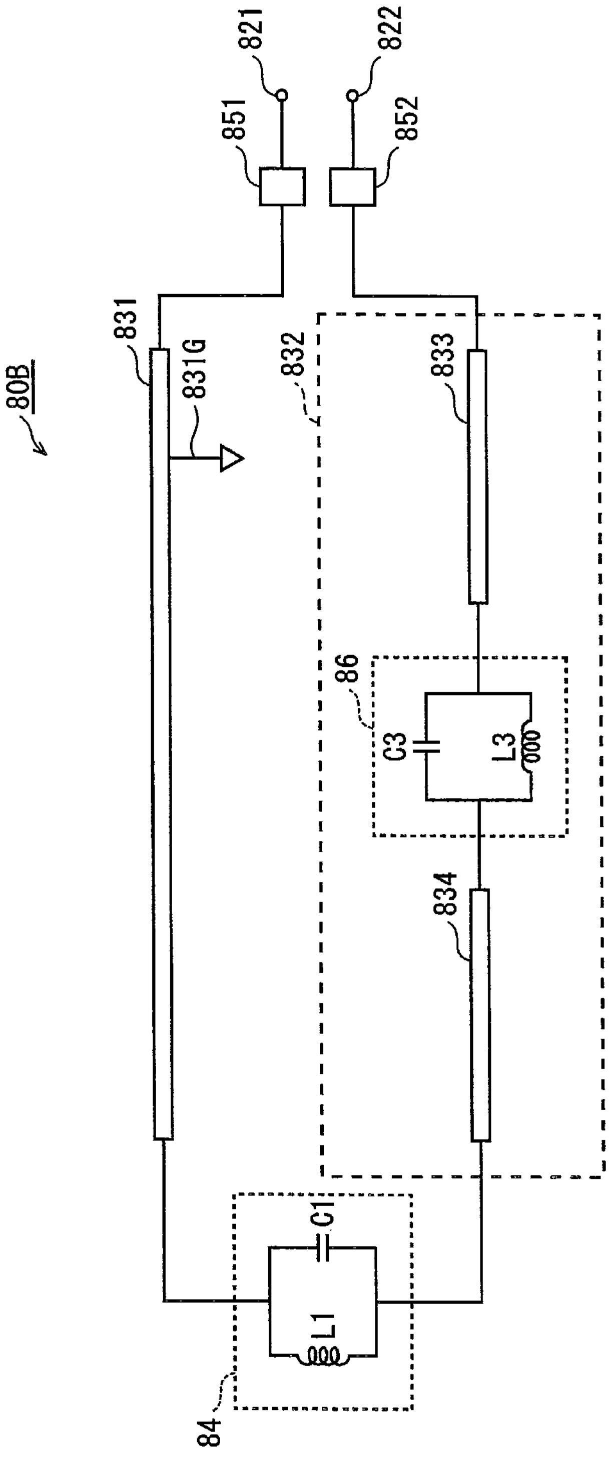
FIG. 7 is an equivalent circuit diagram of the complex antenna shown in FIG. 6.

FIG. 6 is a perspective diagram of a complex antenna 80B pertaining to Embodiment 3 of the present invention. FIG. 7 is an equivalent circuit diagram of the complex antenna 80B. The complex antenna 80B has a second antenna element 832 that differs from that of the complex antenna 80 shown in FIGS. 2 and 3. Aside from this point, the complex antenna 80B pertaining to Embodiment 3 is identical to the above-described complex antenna 80 pertaining to Embodiment 1. That is, the complex antenna 80B shown in FIG. 6 is, like the complex antenna 80 shown in FIG. 2, disposed within the second casing 22 of the mobile phone 10 from FIG. 1 and particularly concentrated in the vicinity of the mouthpiece unit 70. Furthermore, the complex antenna 80B shown in FIG. 6 includes elements identical to the complex antenna 80 shown in FIG. 2. Accordingly, FIGS. 6 and 7 use the same reference numbers as FIGS. 1, 2, and 3 to refer to components identical to those of the complex antenna 80 pertaining to Embodiment 1. Further still, explanations of such identical components can be found in the description of Embodiment 1.

As shown in FIG. 6, the second antenna element 832 includes a third antenna element 833, a trap circuit 86, and a fourth antenna element 834, connected in series.

The third antenna element 833 is a strip of conductive film formed over the substrate 81, i.e., a microstrip. The base end of the third antenna element 833 corresponds to the base end 832A of the second antenna element 832. That is, the base end 832A of the third antenna element 833 is connected to the second feed point 822, extending therefrom along the inside of the ground conductor film 81G and passing through the second matching circuit 852 to the outside of the ground conductor film 81G. Inside the ground conductor film 81G, the base end 832A of the third antenna element 833 is separated from the ground conductor film 81G by a predetermined distance and is thus insulated therefrom. Outside the ground conductor film 81G, the third antenna element 833 extends to an edge of the substrate 81 in the opposite direction as the first antenna element 831, further connected to an end of the trap circuit 86 located at said edge. Here, the impedance of the second matching circuit 852 is set such that the impedance matches between the third antenna element 833 and a communications unit (not shown in FIG. 6) of the mobile phone 10, which is connected to the second feed point 822. The full length of the third antenna element 833, from the base end 832A to the tip end, is shorter than the full length of the first antenna element 831, from the base end 831A to the tip end 831B. For example, let the frequency bands used for communications be 800 MHz and 2 GHz. Here, the full length of the first antenna element 831 is equal to one quarter-length of an electromagnetic wave in the 800 MHz band, while the full length of the third antenna element 833 is equal to one quarter-length of an electromagnetic wave in the 2 GHz band. That is, the resonant frequency of the third antenna element 833 belongs to the 2 GHz band, being higher than the resonant frequency of the first antenna element 831, which belongs to the 800 MHz band.

The fourth antenna element 834 is a strip of conductive film formed over the substrate 81, i.e., a microstrip. The base end of the fourth antenna element 834 is connected to one end of the trap circuit 86. Here, the end is at the opposite side of the end connected to the tip end of the third antenna element 833. The fourth antenna element 834 extends from the trap circuit 86 along the edge of the substrate 81, and then widely snakes on the surface of the substrate 81. The tip of this snaking portion corresponds to the tip end 832B of the second antenna element 832, being connected to another end of the parallel resonant circuit 84 on the opposite side as the tip end 831B of the first antenna element 831. The full length of the fourth antenna element 834, from the base end to the tip end 832B, coincides with the full length of the first antenna element 831 when combined with the full length of the third antenna element 833. FIG. 6 shows the full length of fourth antenna element 834 as adjusted by setting the snaking portion thereof. For example, when the full length of the first antenna element 831 is equal to one quarter-length of an electromagnetic wave in the 800 MHz band, the total length of the third antenna element 833 and the fourth antenna element 834 combined is similarly equal to one quarter-length of an electromagnetic wave in the 800 MHz band. That is, the resonant frequency of the third antenna element 833 and the fourth antenna element 834 combined is equal to that of the first antenna element 831, similarly belonging to the 800 MHz band.

While not illustrated in FIG. 6 for the sake of simplicity, the trap circuit 86 is a parallel resonant circuit made up of a chip inductor and a chip capacitor implemented on the surface of the end of the substrate 81.

As shown in FIG. 7, the trap circuit 86 is equivalent to an inductor of inductance L3 and a capacitor of capacitance C3, connected in parallel. The resonant frequency of the equivalent circuit is $1/\{2\pi(L3\times L3)^{1/2}\}$. This is also equal to the resonant frequency of the third antenna element 833. That is, the resonant frequency of the trap circuit 86 belongs to the 2 GHz band.

The resonant frequency of the trap circuit 86 is equal to that of the third antenna element 833. Thus, the impedance of the trap circuit 86 is sufficiently high in the neighborhood of that resonant frequency. Accordingly, any resonance produced by the feed from the second feed point 822 in the third antenna element 833 alone is blocked by the trap circuit 86 and prevented from reaching the fourth antenna element 834. However, the resonant frequency of the second antenna element 832 as a whole, i.e., of the third antenna element 833, the trap circuit 86, and the fourth antenna element 834 as a serially-connected whole, is equal to that of the first antenna element 831 and lower than that of the trap circuit 86. Thus, the impedance of the trap circuit 86 is sufficiently low in the neighborhood of that resonant frequency. Accordingly, the feed from the second feed point 822 is quite able to cause resonance in the entire second antenna element 832. As such, the second antenna element 832 may resonate as a whole, or the third antenna element 833 may resonate alone. That is, the second antenna element 832 is useable as a two-band antenna.

Like the reception processing of Embodiment 1, the antenna switch 90 and the signal processing unit 100 use the first antenna element 831 and the second antenna element 832 in the diversity function for signal processing in the lower frequency band, e.g., 800 MHz, used by the second antenna element 832. On the other hand, for reception processing in the higher frequency band, e.g., 2 GHz, used by the complex antenna 80B, the signal processing unit 100 causes the antenna switch 90 to connect the third port 93 to the second port 92 and detects, from the output RS of the third port 93, the signal captured by the third antenna element 833 alone, that is, the signal in the higher frequency band, e.g., 2 GHz, used by the second antenna element 832. As such, the mobile phone pertaining to Embodiment 3 of the present invention also uses two different frequency bands, e.g., 800 MHz and 2 GHz, with a single complex antenna 80A.

During reception in the lower frequency band, e.g., 800 MHz, with the second antenna element 832, the parallel resonant circuit 84 prevents interference between the two antenna elements 831 and 832. Accordingly, like the complex antenna 80 pertaining to Embodiment 1, the complex antenna 80B can be used in the diversity function of the reception system of the mobile phone 10. That is, the complex antenna 80B maintains sufficiently good reception characteristics, despite the two antenna elements 831 and 832 being integrated on a common substrate 81 as shown in FIG. 6 and concentrated in the vicinity of the mouthpiece unit 70 of the mobile phone 10 as shown in FIG. 1. As such, the proportional internal surface area of the second casing 22 of the mobile phone 10 occupied by the complex antenna 80 is appreciably decreased while maintaining said good reception characteristics.

The complex antenna pertaining to the above-described Embodiments of the present invention has two antenna elements with a common resonant frequency, each connected at a tip end to a parallel resonant circuit. Accordingly, the voltages of the two antenna elements maintain the same direct current component. Also, given that the resonant frequency of the parallel resonant circuit is equal to that of the antenna elements, resonance in one of the antenna elements never reaches the other through the parallel resonant circuit. The resulting effect decreases the incidence of interference between the two antenna elements, irrespective of the distance therebetween. Accordingly, the complex antenna pertaining to the Embodiments of the present invention enables miniaturization of the two antenna elements while suppressing interference therebetween.

The mobile phone pertaining to the above-described Embodiments of the present invention uses the complex antenna in the diversity function. With such a complex antenna, the proportional internal surface area of the mobile phone occupied by the two antenna elements can be appreciable decreased, without increasing interference therebetween. Accordingly, the mobile phone pertaining to the Embodiments of the present invention allows further improvements in communications quality and in connectivity with the base station through the effect of the diversity function. Furthermore, greater miniaturization and multi-functionality can be realized.

[Variations]

The above describes preferred Embodiments of the present invention. However, the technological scope of the present invention is not limited to the above-described Embodiments. In fact, variations of the Embodiments are possible, such as the examples given below.

(1) The mobile phone pertaining to the present invention may have a casing of a shape other than the clamshell of the above-described Embodiments. For example, one portion of the casing may be made rotatable about the rest of the casing. Other non-clamshell casing variations are also possible.

(2) The display unit of the mobile phone pertaining to the present invention may be other than the liquid crystal display 40 of the above-described Embodiments. An organic EL display or other small-to-medium display may also be used. In addition, the operation panel 60 may include a touch screen apart from the button group of the above-described Embodiments.

(3) The complex antenna pertaining to the present invention may be incorporated in devices other than the mobile phone of the above-described Embodiments, such as a personal digital assistant, a wireless LAN card, and other similar small, wireless communications devices. The complex antenna of the present invention facilitates miniaturization, and is thus applicable to the overall miniaturization of any wireless communications device implementing the complex antenna.

(4) The complex antenna pertaining to the present invention may differ from the above-described Embodiments in being formed on a substrate other than that on which the mobile phone control circuit is implemented. Also, the two antenna elements may differ from the above-described Embodiments in being formed of plated metal rather than a microstrip on a substrate. In such circumstances, the two feed points may be connected to the port of the antenna switch via coaxial cable. Alternatively, the two feed points may be formed by conductive pins and connected directly to the antenna switch or to a trace on the substrate where the antenna switch is mounted. Furthermore, the shape of the two antenna elements may be other than that described for the above Embodiments. Specifically, and unlike the illustration of FIG. 2, the antenna elements need not exhibit symmetry with respect to the straight virtual line extending along the substrate. However, such symmetry is effective in enhancing miniaturization of the complex antenna.

(5) The complex antenna pertaining to the present invention may differ from the above-described Embodiments in that the capacitor included in the parallel resonant circuit or in the series resonant circuit may be the parasitic capacitance of the microstrip formed on the substrate.

(6) The mobile phone pertaining to the present invention may have a virtual plane unlike that proposed for FIG. 1, which, as shown, passes through the mouthpiece unit 70 and the earphone unit 50 when the first casing 21 and the second casing 22 are open. Instead, the virtual plane may obliquely intersect the surface of the first casing 21 that includes the screen of the display unit 40 and the surface of the second casing 22 that includes the button group of the operation panel 60, or may be substantially parallel to said surfaces while the first antenna element 831 and the second antenna element 832 exhibit symmetry with respect to the virtual plane within the second casing 22. In such circumstances, the first antenna element 831 may, for instance, be disposed near the surface of the second casing 22 that includes the operation panel 60, while the second antenna element 832 is disposed at the opposite side of the surface of the second casing 22. Accordingly, when the mobile phone is, for example, placed on a desk, the two antenna elements 831 and 832 come to be at different distances from the surface of the desk. Thus, despite any negative effects on reception characteristics of the antenna elements owing to the surface of the desk being made of steel, for example, the two antenna elements 831 and 832 are each affected to a different degree. Consequently, good reception characteristics can be maintained by switching the one of the antenna elements 831 and 832 used for communications. In other words, the diversity function is highly effective.

(7) The mobile phone pertaining to the present invention may differ from the above-described Embodiments in evaluating the received signal quality from only one of the signal strength and the error rate. In such circumstances, the signal processing unit shown in FIG. 3 may omit either the error rate detector or the pair consisting of the received signal strength indicator and the received signal strength calculator, whichever is not used for signal quality evaluation.

(8) The mobile phone pertaining to the present invention may include a filter between any two of the complex antenna 80, the antenna switch 90, the high-frequency amplifier 211, the mixer 212, the intermediate frequency amplifier 214, the demodulator 220, and the control unit 300 shown in FIG. 3 that are directly connected, so as to have only desired frequency components pass from one to the other of the chosen pair. Also, unlike the above-described Embodiments, the extractor may be either of a direct conversion type and a low-IF (intermediate frequency) type.

(9) The mobile phone pertaining to the present invention is not limited to reception with the complex antenna of the above-described Embodiments. Transmission therewith is also possible. In such circumstances, the control unit 300 transmits using whichever of the two antenna elements 831 and 832 has most recently been selected in the reception processing.

(10) The control unit 300 of the mobile phone pertaining to the present invention may repeatedly reiterate the steps S2 through S6 of the reception process shown in FIG. 4 as a loop. When the number of repetitions reaches a predetermined threshold, that is, when the antenna element has been switched for a number of times equal to the threshold, the reception process may cease if the received signal strength or error rate remain outside the tolerance ranges. In such circumstances, the control unit 300 may additionally notify the user of reception errors preventing the effect of the diversity function from being realized, through a display on the screen on the display unit 40 or through sound or the like.

(11) The trap circuit 86 of the mobile phone pertaining to Embodiment 3 of the present invention may include a series resonant circuit before or after the parallel resonant circuit shown in FIG. 7. The series resonant circuit is similar to the series resonant circuit 84A pertaining to Embodiment 2, having a resonant frequency equal to that of the third antenna element 833 and the fourth antenna element 834 taken as a whole. By adjusting the impedance of the series resonant circuit, the connective impedance between the two antenna elements 833 and 834 may be made sufficiently low in the neighborhood of the resonant frequency. Accordingly, the series resonant circuit of the second antenna element 832 further improves reception characteristics in the lower frequency band.

(12) Either one of the first antenna element and the second antenna element of the complex antenna pertaining to the present invention may include two antenna elements, each connected in series to a trap circuit, like the second antenna element pertaining to Embodiment 3. As such, the total serially-connected portion may be made to resonate as a whole, or the antenna element connected between the feed point and the trap circuit may be made to resonate alone. That is, the first antenna element and the second antenna element may each form a two-band antenna, similar to the second antenna element of Embodiment 3. In such circumstances, the resonant frequency for the higher frequency band may vary between the first antenna element and the second antenna element. When the first antenna element and the second antenna element have different resonant frequencies for the higher frequency band, the signal processing unit continues to cause the third port of the antenna switch to connect to one of the first port and the second port according to the frequency being received. When the first antenna element and the second antenna element have equal resonant frequencies for the higher frequency band, the signal processing unit uses the two antenna elements in the diversity function, regardless of whether the reception process is using the higher or lower frequency band.

(Supplement)

Based on the above-described Embodiments and variations of the present invention, characteristic features thereof may be considered from the following viewpoints.

1. The complex antenna of the present invention may include a series resonant circuit disposed at the connection between the tip end of the first antenna element and the parallel resonant circuit, or between the tip end of the second antenna element and the parallel resonant circuit. Taking the full length, from the base end of the first antenna element through the parallel resonant circuit to the base end of the second antenna element, to be a single antenna element, the resonant frequency of the series resonant circuit is equal to that of the single antenna element. Therefore, the complex antenna is usable as a two-band antenna. The mobile phone pertaining to the present invention may also incorporate such a complex antenna. In such circumstances, when the signal processing unit has caused the antenna switch to connect the third port to one of the first port and the second port, the signal detected from the output of the third port is either the signal captured by the first antenna element or by the second antenna element, or is the signal captured by the whole. Thus, the mobile phone is able to communicate over two different frequency bands.
2. In the complex antenna pertaining to the present invention, the second antenna element may include a third antenna element, a trap circuit, and a fourth antenna element, connected in series. The third antenna element has a base end connected to the second feed point and a tip end connected to one end of the trap circuit, such that the resonant frequency is higher than that of the first antenna element. The other end of the trap circuit is connected to the base end of the fourth antenna element. The trap circuit is a resonant circuit, preferably a parallel resonant circuit, having a resonant frequency equal to that of the third antenna element. The fourth antenna element has a tip end corresponding to the tip end of the second antenna element. The serially-connected third antenna element, trap circuit, and fourth antenna element, taken as a whole, resonate at a frequency equal to the resonant frequency of the first antenna element. However, the resonant frequency of the trap circuit is equal to that of the third antenna element. Thus, the resonance of the third antenna element is not transmitted to the fourth antenna element. As such, the second antenna element may resonate as a whole, or the third antenna element may resonate alone. That is, the second antenna element is useable as a two-band antenna. The mobile phone pertaining to the present invention may also incorporate such a complex antenna. In such circumstances, when the antenna switch has connected the third port to the second port, the signal processing unit detects, from the output of the third port, the signal captured by either of the second antenna element as a whole and the third antenna element alone. As such, the mobile phone is able to communicate over two different frequency bands.
3. The complex antenna pertaining to the present invention may further include an insulating substrate, such that the first antenna element and the second antenna element each include a band-shaped conductor extending along the surface of the substrate while the parallel resonant circuit includes a passive element mounted on the surface of the substrate. Here, the substrate may also be a flexible substrate. Given that the complex antenna may thus be realized as a film antenna, miniaturization is facilitated thereby.
4. In the mobile phone pertaining to the present invention, the signal processing unit may evaluate the quality of the signal detected from the output of the third port when the third port is connected to one of the first port and the second port. If the quality of signal is evaluated as falling outside the tolerance range, then a control signal may be applied to the antenna switch so as to switch the connection of the third port from one of the first port and the second port to the other. Accordingly, the mobile phone pertaining to the present invention is able to use the complex antenna in the diversity function.

In such circumstances, when the third port is connected to one of the first port and the second port, the signal processing unit may evaluate the quality of the signal detected from the output of the third port based on the strength thereof. The signal processing unit preferably includes a communications unit and a control unit. The communications unit is connected to the third port of the antenna switch, and detects a signal captured by the first antenna element or by the second antenna element from the output of the third port of the antenna switch. The communications unit includes an extractor, a demodulator, and a received signal strength indicator. The extractor extracts a signal at the resonant frequency of the first antenna element or of the second antenna element from the output of the third port. The demodulator demodulates the signal extracted by the extractor into a signal at a predetermined frequency. Here, the signal at the predetermined frequency is a signal that can be processed by the control unit, preferably a baseband signal. The received signal strength indicator detects the strength of the signal extracted by the extractor. The control unit applies a control signal to the antenna switch so as to cause the antenna switch to connect the third port to one of the first port and the second port. At this point, the control unit receives the signal detected by the communications unit therefrom. When the third port is connected to one of the first port and the second port, the control unit further determines whether or not the strength of the signal detected by the received signal strength indicator falls within the tolerance range. In the negative case, the control unit applies a control signal to the antenna switch so as to cause the antenna switch to switch the connection of the third port from one of the first port and the second port to the other.

Otherwise, when the third port is connected to one of the first port and the second port, the signal processing unit may evaluate the quality of the signal detected from the output of the third port based on the error rate thereof The signal processing unit preferably includes a communications unit and a control unit. The communications unit connects the third port of the antenna switch, and detects a signal captured by the first antenna element or by the second antenna element from the output of the third port of the antenna switch. The control unit applies a control signal to the antenna switch so as to cause the antenna switch to connect the third port to one of the first port and the second port. At this point, the control unit receives the signal detected by the communications unit therefrom. The control unit particularly includes an error rate detector. The error rate detector detects the error rate of the signal received from the communications unit. When the third port is connected to one of the first port and the second port, the control unit determines whether or not the error rate of the signal detected by the error rate detector falls within the tolerance range. In the negative case, the control unit applies a control signal to the antenna switch so as to cause the antenna switch to switch the connection of the third port from one of the first port and the second port to the other.

5. The mobile phone pertaining to the present invention may have the two antenna elements of the complex antenna disposed as follows. Given the shape of the mobile phone casing when used for a call, two areas exist within the casing, having symmetry with respect to a virtual plane intersecting the mouthpiece unit and the earphone unit of the mobile phone. The first antenna element is disposed in one such area while the second antenna element is disposed in the other.

Here, the shape of the mobile phone casing when used for a call refers to a uniform shape of said casing, specifically that taken by the casing when used for a call, although the shape may vary for other uses. For example, let the mobile phone pertaining to the present invention be a clamshell phone, with two casings connected by a hinge that can be opened and closed. Here, the shape of the mobile phone casing when used for a call refers to the overall shape when the two casings are open.

The mouthpiece unit of the mobile phone refers to the portion that includes a microphone for converting the user's voice into electronic signals. The earphone unit of the mobile phone refers to the portion that includes a speaker for playing back sound produced by the opposite party. Generally, when the mobile phone is used for a call, the mouthpiece unit is near the user's mouth while the earphone unit is near the user's ear. At this time, the mobile phone is typically covered by the user's hand, and the covered portion of the casing greatly varies depending on whether the user's hand is a right hand or a left hand. Particularly, the different portions covered by a right hand or a left hand exhibit symmetry with respect to a virtual plane traversing the mouthpiece unit and the earphone unit. That is, given that the plane divides the casing into two areas, one of the two areas is covered more than the other when the hand is a right hand, with the opposite case being true when the hand is a left hand.

A mobile phone in which the antenna elements are disposed according to the above-described viewpoint 5 creates a greater probability that, although one of the antenna elements may be covered by the user's hand, the other element is not so covered. That is, according to the above-described disposition, the effects of the diversity function can be reliably achieved despite the two antenna elements being in proximity to each other.

[Industrial Applicability]

The present invention relates to an antenna implemented in a mobile phone. As described above, a parallel resonant circuit is connected between the tip ends of two antenna elements having base ends connected to different feed points. As such, the present invention clearly has industrial applicability.

[Reference Signs List]

80 Complex antenna
821 First feed point
822 Second feed point
831 First antenna element
831G First antenna element branch portion
832 Second antenna element
84 Parallel resonant circuit
851 First matching circuit
852 Second matching circuit
90 Antenna switch
91 First port
92 Second port
93 Third port
CTL Control signal
RS Third port output
BB Baseband signal
RSSI Received signal strength indicator

The invention claimed is:

1. A complex antenna comprising:

a first feed point and a second feed point, distinct from each other;

a first antenna element connected at a base end thereof to the first feed point;

a second antenna element connected at a base end thereof to the second feed point and having a resonant frequency equal to the resonant frequency of the first antenna element; and a parallel resonant circuit connected between a tip end of the first antenna element and a tip end of the second antenna element, resonating at a frequency equal to the resonant frequency of the first antenna element.

2. The complex antenna of claim 1, further comprising:

a series resonant circuit disposed at a connecting portion between the tip end of the first antenna element and the parallel resonant circuit, or at a connecting portion between the tip end of the second antenna element and the parallel resonant circuit; wherein when an entire portion from the base end of the first antenna element through the parallel resonant circuit to the base end of the second antenna element is treated as a single antenna element, the resonant frequency of the series resonant circuit is equal to the resonant frequency of the single antenna element.

3. The complex antenna of claim 1, wherein the second antenna element includes a third antenna element, a trap circuit, and a fourth antenna element, connected in series, a base end of the third antenna element is connected to the second feed point, a tip end of the third antenna element is connected to the trap circuit at one side thereof, and the resonant frequency of the third antenna element is higher than the resonant frequency of the first antenna element, a base end of the fourth antenna element is connected to the trap circuit at another side thereof, and the resonant frequency of the trap circuit is equal to the resonant frequency of the third antenna element, a tip end of the fourth antenna element corresponds to the tip end of the second antenna element, and the third antenna element, the trap circuit, and the fourth antenna element are connected in series into a whole, the whole resonating at a frequency that is equal to the resonant frequency of the first antenna element.

4. The complex antenna of claim 1, further comprising an insulating substrate, wherein the first antenna element and the second antenna element each include a band of conductor extending along a surface of the substrate, and the parallel resonant circuit includes a passive element implemented on the surface of the substrate.

5. A mobile phone comprising:

a complex antenna including:

a first feed point and a second feed point, distinct from each other;

a first antenna element connected at a base end thereof to the first feed point;

a second antenna element connected at a base end thereof to the second feed point and having a resonant frequency equal to the resonant frequency of the first antenna element;

a parallel resonant circuit connected between a tip end of the first antenna element and a tip end of the second antenna element, resonating at a frequency equal to the resonant frequency of the first antenna element;

an antenna switch including (i) a first port connected to the first feed point, (ii) a second port connected to the second feed point, and (iii) a third port distinct from the first port and the second port, receiving a control signal from outside and connecting the third port to one of the first port and the second port in accordance with the received control signal; and a signal processing unit applying the control signal to the antenna switch so as to cause the antenna switch to connect the third port to one of the first port and the second port, and detecting a signal captured by the first antenna element or by the second antenna element from output of the third port.

6. The mobile phone of claim 5, wherein when the third port is connected to one of the first port and the second port, the signal processing unit evaluates a quality of the signal detected from the output of the third port, and when the evaluated quality of the signal falls outside a tolerance range, the signal processing unit applies the control signal to the antenna switch so as to cause the antenna switch to switch the connection of the third port from one of the first port and the second port to the other.

7. The mobile phone of claim 6, wherein when the third port is connected to one of the first port and the second port, the signal processing unit evaluates the quality of the signal evaluated based on the strength of the signal detected from the output of the third port.

8. The mobile phone of claim 7, wherein the signal processing unit includes:

a communications unit connected to the third port of the antenna switch, detecting the signal captured by the first antenna element or by the second antenna element from the output of the third port; and a control unit applying the control signal to the antenna switch so as to cause the antenna switch to connect the third port to one of the first port and the second port, and receiving the signal currently detected by the communications unit from the communications unit, the communications unit further includes:

an extractor extracting a signal at the resonant frequency of the first antenna element and of the second antenna element from the output of the third port;

a demodulator demodulating the signal extracted by the extractor into a signal at a predetermined frequency; and a received signal strength indicator indicating the strength of the signal extracted by the extractor, and when the third port is connected to one of the first port and the second port, the control unit determines whether or not the strength of the signal as indicated by the received signal strength indicator falls within the tolerance range, and applies the control signal to the antenna switch so as to cause the antenna switch to switch the connection of the third port from one of the first port and the second port to the other when the strength of the signal falls outside the tolerance range.

9. The mobile phone of claim 6, wherein when the third port is connected to one of the first port and the second port, the signal processing unit evaluates the quality of the signal based on the error rate of the signal detected from the output of the third port.

10. The mobile phone of claim 9, wherein the signal processing unit includes:

a communications unit connected to the third port of the antenna switch, detecting the signal captured by the first antenna element or by the second antenna element from the output of the third port; and a control unit applying the control signal to the antenna switch so as to cause the antenna switch to connect the third port to one of the first port and the second port, and receiving the signal currently detected by the communications unit from the communications unit, the control unit further includes an error rate detector detecting the error rate of the signal received from the communications unit, and when the third port is connected to one of the first port and the second port, the control unit determines whether or not the error rate of the signal as detected by the error rate detector falls within the tolerance range, and applies the control signal to the antenna switch so as to cause the antenna switch to switch the connection of the third port from one of the first port and the second port to the other when the error rate of the signal falls outside the tolerance range.

11. The mobile phone of claim 5, wherein the complex antenna further comprises a series resonant circuit disposed at a connecting portion between the tip end of the first antenna element and the parallel resonant circuit, or at a connecting portion between the tip end of the second antenna element and the parallel resonant circuit, when an entire portion from the base end of the first antenna element through the parallel resonant circuit to the base end of the second antenna element is treated as a single antenna element, the resonant frequency of the series resonant circuit is equal to the resonant frequency of the single antenna element, and when the antenna switch has been made to connect the third port to one of the first port and the second port, the signal processing unit detects the signal captured by the single antenna element from the output of the third port.

12. The mobile phone of claim 5, wherein the second antenna element includes a third antenna element, a trap circuit, and a fourth antenna element, connected in series, a base end of the third antenna element is connected to the second feed point, a tip end of the third antenna element is connected to the trap circuit at one side thereof, and the resonant frequency of the third antenna element is higher than the resonant frequency of the first antenna element, a base end of the fourth antenna element is connected to the trap circuit at another side thereof, and the resonant frequency of the trap circuit is equal to the resonant frequency of the third antenna element, a tip end of the fourth antenna element corresponds to the tip end of the second antenna element, the third antenna element, the trap circuit, and the fourth antenna element are connected in series into a whole, the whole resonating at a frequency that is equal to the resonant frequency of the first antenna element, and when the antenna switch has been made to connect the third port to the second port, the signal processing unit detects, from the output of the third port, the signal captured by the second antenna element as whole or the signal captured by the third antenna element alone.

13. The mobile phone of claim 5, wherein with reference to a shape of a casing of the mobile phone when used for a call, two areas within the casing are defined so as to be symmetrical with respect to a virtual plane intersecting an earphone and a mouthpiece of the mobile phone, the first antenna element is disposed in one of the two areas, and the second antenna element is disposed in the other one of the two areas.

* * * * *